United States Patent [19]
McIntyre et al.

[11] Patent Number: 5,838,480
[45] Date of Patent: Nov. 17, 1998

[54] OPTICAL SCANNING SYSTEM WITH DIFFRACTIVE OPTICS

[75] Inventors: Kevin J. McIntyre, Rochester; G. Michael Morris, Fairport, both of N.Y.

[73] Assignee: The University of Rochester, Rochester, N.Y.

[21] Appl. No.: 639,588

[22] Filed: Apr. 29, 1996

[51] Int. Cl.[6] .................................................. G02B 26/08
[52] U.S. Cl. ........................ 359/205; 359/206; 359/207; 359/212; 359/216; 359/17
[58] Field of Search ..................................... 359/205–207, 359/212–219, 17, 19, 563, 568–570, 900

[56] References Cited

U.S. PATENT DOCUMENTS

| | | | |
|---|---|---|---|
| 4,176,907 | 12/1979 | Matsumoto et al. | 359/217 |
| 5,031,979 | 7/1991 | Itabashi . | |
| 5,086,350 | 2/1992 | Nishihata . | |
| 5,208,701 | 5/1993 | Maeda . | |
| 5,247,385 | 9/1993 | Takanashi . | |
| 5,270,850 | 12/1993 | Mochizuki et al. . | |
| 5,270,851 | 12/1993 | Makino et al. . | |
| 5,329,399 | 7/1994 | Ho . | |
| 5,486,694 | 1/1996 | Harris . | |

OTHER PUBLICATIONS

R. Hopkins & R. Hanau, "Geometrical Optics" and R. Hopkins Optical Design, U.S. Military Standarization Handbook for Optical Design, Sinclair Optics, pp. 9–1–9–11, Mar. 1987.

D. Stephenson, "Diffractive Optical Elements Simplify Scanning Systems", Laser Focus World, pp. 75–80, Jun. 1995.

*Primary Examiner*—James Phan
*Attorney, Agent, or Firm*—M. Lukacher; K. Lukacher

[57] ABSTRACT

An improved optical system having diffractive optic elements is provided for scanning a beam. This optical system includes a laser source for emitting a laser beam along a first path. A deflector, such as a rotating polygonal mirror, intersects the first path and translates the beam into a scanning beam which moves along a second path in a scan plane. A lens system (F-θ lens) in the second path has first and second elements for focusing the scanning beam onto an image plane transverse to the scan plane. The first and second elements each have a cylindrical, non-toric lens. One or both of the first and second elements also provide a diffractive element, which provides not only astigmatic correction, but may further provide chromatic aberration correction of the scanning beam. This astigmatic correction is achieved without the presence of any lens having a toroidal (toric) surface. The system may further have a third element in the first path of the beam prior to the deflector. This third element provides a lens having another diffractive element. This diffractive element can correct chromatic and spherical aberration of the scanning beam in the cross-scan plane, a plane perpendicular to the scan plane.

18 Claims, 10 Drawing Sheets

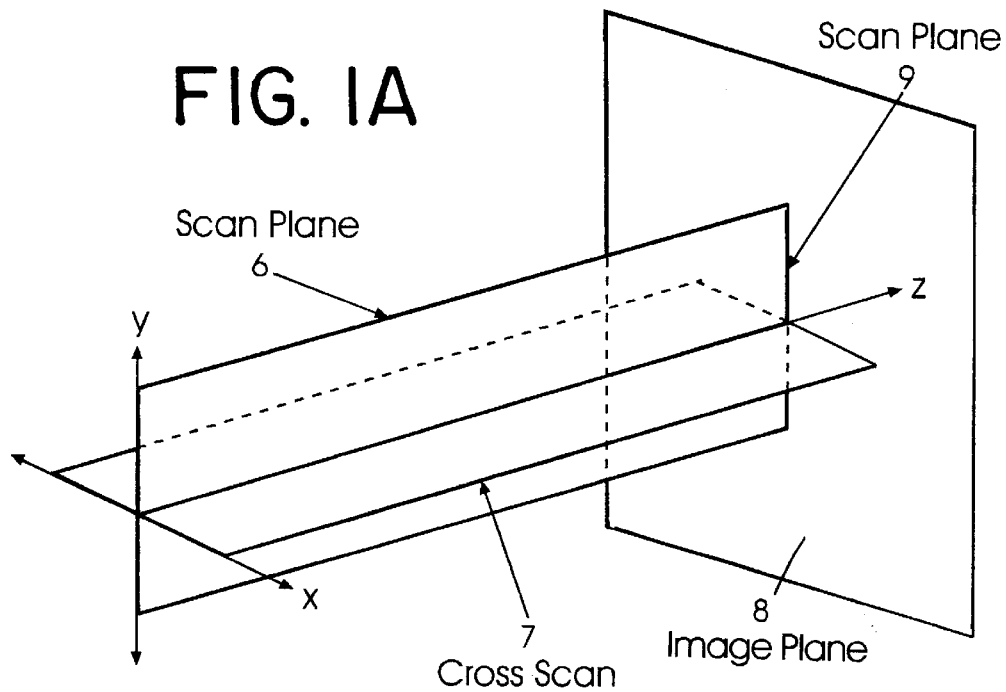
FIG. IA
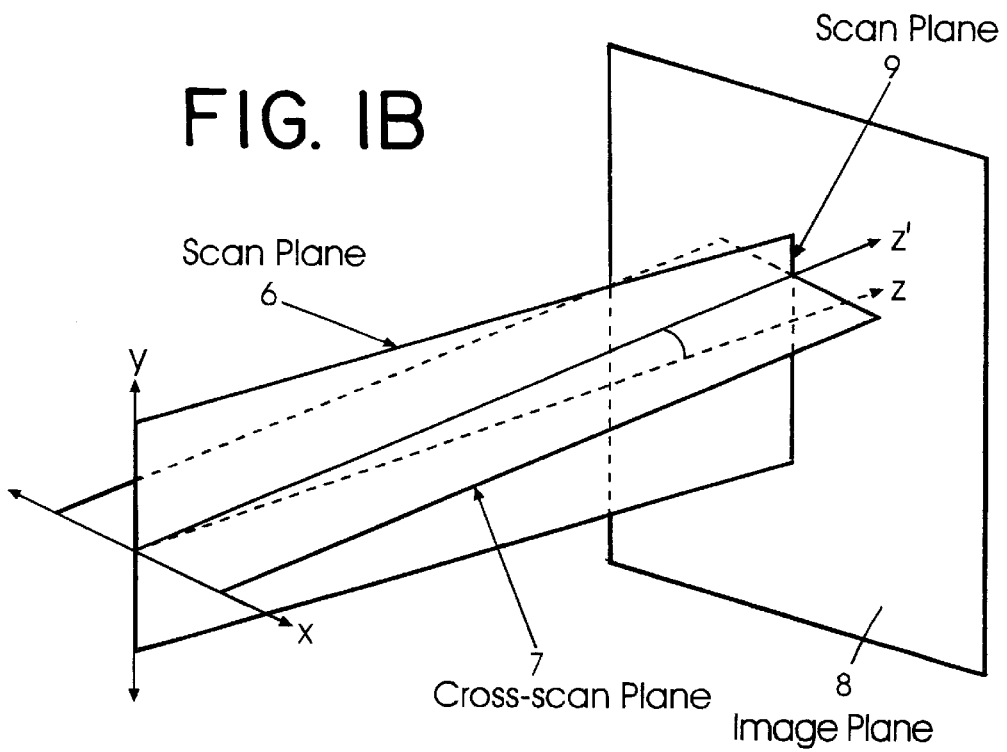
FIG. IB

Scan Plane

Cross-scan Plane

Beam Path I ———
Beam Path II -----

Scan Plane

Cross-scan Plane

Scan Plane

Cross-scan Plane

OPTICAL SCANNING SYSTEM WITH DIFFRACTIVE OPTICS

FIELD OF THE INVENTION

The present invention relates to an optical lens system for scanning a beam, and more particularly to, an improved optical system having a F-θ lens system with a diffractive optic element for correction of the scanning beam which avoids the need for toric optics.

BACKGROUND OF THE INVENTION

Typically, F-θ lenses are used to correct and focus a laser beam as it scans across a photosensitive substrate, such as photographic film or a photosensitive drum. These lenses have the unique property that the lateral position of the laser spot on the substrate is proportional to the scan angle, the angular displacement of the beam from the center of scan. The beam is deflected at the scan angle by a scanning deflector, such as a rotating polygonal mirror.

A plane geometry model of the laser beam deflected from a scanning deflector is defined in reference to FIGS. 1A and 1B. Using an x, y, z coordinate system, FIG. 1A illustrates the orientation of a scan plane 6, a cross-scan plane 7 and an image plane 8 for a beam at the center of scan (zero scan angle) from a scanning deflector (not shown) such that the central ray of the beam propagates along the z-axis. As will be shown later, the F-θ lens is located in the beam path from the scanning deflector to image plane 8. At the center of scan of the beam, scan plane 6 is an y–z plane, cross-scan plane 7 is a x–z plane, and image plane 8 is a plane perpendicular to both scan and cross-scan planes 6 and 7. A scan line 9 is a line along which the imaged beam scans on image plane 8 and defines a line segment parallel to the y-axis. FIG. 1B illustrates planes 6–8 for non-zero scan angles of the laser beam from the scanning deflector, in which cross-scan plane 7 has rotated with respect to the x-axis by scan angle θ from the x–z plane to the x–z' plane. In other words, the central ray of the beam enters the F-θ lens (not shown) along the z'-axis which is tilted with respect to the z-axis by scanning angle θ. Note that irrespective of scan angle θ, scan plane 6 and cross-scan plane 7 are perpendicular to each other. Further note, that the beam may also be referenced prior to being deflected by the scanning deflector by a scan plane and a cross-scan plane, oriented perpendicular to the scan plane, in which the intersection of these two planes contains the central ray of the laser beam incident on the scanning deflector.

FIG. 2 shows a typical arrangement for an F-θ lens scanning system 10 which includes a laser source 11, a collimating lens 12, a cylindrical lens 13, a rotating polygonal mirror 14, a F-θ lens 15, and a substrate 16. The polygonal mirror 14 rotates about an axis 17 (which is parallel to the x-axis) causing a rotation of laser beam 19 in the scan plane. The collimating lens 12 transforms the beam emitted by laser source 11 into a collimated or nearly collimated beam 18. The cylindrical lens 13 has power only in a cross-scan plane to form a line image on or near polygonal mirror 14.

The F-θ lens 15 focuses the incident beam 19 to form a small spot on substrate 16, which lies in the image plane, with a lateral position in the scan plane given by y=F·θ, where y is the lateral position in the scan plane, F is the focal length of the F-θ lens in the scan plane, and θ is the scan angle (in radians) of the incident beam 19 with respect to the optical axis of F-θ lens 15. Focal length F, also called the effective focal length, is approximately the distance from the second principle point of F-θ lens 15 in the scan plane to the image plane. Since beam 19 incident on F-θ lens 15 is collimated or nearly collimated in the scan plane and diverging in the cross-scan plane, the F-θ lens must provide greater optical power in the cross-scan plane than in the scan plane in order to form a small focused spot at substrate 16. This requires the use of anomorphic optics, which includes both cylindrical and toroidal surfaces, in F-θ lens 15. Toroidal surfaces refer to lens surfaces having different curvatures in mutually orthogonal planes.

Anomorphic optics are used in F-θ lens 15 due to the focusing of a line image on polygonal mirror 14. Such focusing of a line image is needed to reduce cross-scan errors. For instance, if the planes containing reflecting mirror facets 14a in rotating polygonal mirror 14 are titled, i.e., not parallel to the axis of rotation, due to, for example, fabrication errors or mirror 14 wobble, the reflected beam will be deviated laterally in the cross-scan plane, thereby resulting in an undesirable shift of the spot image on substrate 16. Forming a line image at mirror facets 14a tends to negate this image shift and allows for significantly larger tolerances in the construction of polygonal mirror 14. This tilt invariance effect is illustrated in FIGS. 3A and 3B which show the beam path from one of mirror facets 14a to substrate 16 in the scan and the cross-scan planes, respectively. In the scan plane shown in FIG. 3A, the laser beam reflected from mirror facet 14a is collimated or nearly collimated. F-θ lens 15 focuses beam 19 to an image spot at the image plane of substrate 16. The scan angle of the reflecting mirror facet 14A in the scan plane corresponds to the rotation of the polygonal mirror 14 to achieve a scanning effect. However, in the cross-scan plane shown in FIG. 3B, the laser beam appears to diverge from a point on mirror facet 14a surface. F-θ lens 15 forms a real image of this point at the image plane of substrate 16. Two beam paths I and II are shown in FIG. 3B to illustrate the tilt invariance effect. Beam path I (shown as a solid line) is the path from an un-tilted mirror facet 14a, i.e., the plane of the mirror facet 14a is parallel to the axis of rotation 17. Beam path 2 (shown as a dashed line) is the beam path from a tilted mirror facet 14a, i.e., the plane of mirror facet 14a is not parallel to the axis of rotation 17. The image position on substrate 16 is the same for both beam paths I and II since polygonal mirror 14 and the image plane are approximately conjugate to one another in the cross-scan plane.

Due to the relatively small apertures and large scanning angles required with many F-θ lenses, correction of field curvature has been an important consideration in optical scanning systems. This field curvature is comprised of Petzval field curvature and astigmatism. The former is a function of the refractive (or reflective) power at each surface and is corrected by properly balancing the surface powers throughout the system. The latter depends not only on the design of the lenses and polygonal mirror 14 of the system, but also the position of various elements within the system. Astigmatism is characterized as the difference in the image plane position between tangential rays (rays in the scan plane) and sagittal rays (rays in the cross-scan plane), and it varies with the scanning angle. This is generally referred to as regular astigmatism. In addition, F-θ lenses having anomorphic optics also exhibit on-axis or axial astigmatism due to the non-rotationally symmetric distribution of power among cylindrical and/or toric surfaces within the system. Correction of axial astigmatism is accomplished by making the mirror surface of polygonal mirror 14 and the image plane (substrate) approximately conjugate to one another in the cross-scan plane, while making the image plane approximately conjugate to infinity in the scan plane. With these two conditions satisfied, correcting for regular astigmatism typically requires use of at least one lens with a toric (toroidal) surface if the total number of lens elements in the F-θ lens is to be kept to a minimum. This is shown, for example, in the F-θ lens designs described in U.S. Pat. Nos. 5,031,979, 5,270,850 and 5,329,399.

A significant problem arising from the use of lens with toric surfaces in prior art optical scanning systems is that toric optics are expensive and difficult to manufacture. Their manufacture normally requires specialized machinery to cut and grind a lens surface in the required asymmetrical manner. Therefore, it is desirable to have an optical scanning system with a F-θ lens that can achieve the same astigmatism correction as anomorphic multi-element refractive optics without using a toric surface, and also without increasing the number of elements in the optics.

Many optical scanning systems with a F-θ lens utilize semiconductor lasers for source 11. The output wavelength of the beam from these semiconductor lasers increases as the temperature increases. This is a problem because system 10 operation generates heat and even slight increases in temperature will affect the output wavelength of the beam. Typically, the wavelength variation can be approximately characterized by the scale factor of 0.2 nm/degree C., which corresponds to a wavelength shift of 10 nm over a temperature range of 50 degrees. The optical effect of this wavelength shift, for a system which cannot accommodate it, is a change in the size and the position of the image spot at the image plane due to longitudinal and transverse chromatic aberration, respectively. Longitudinal chromatic aberration refers to a change in image plane position as a function of wavelength, i.e., a wavelength dependent defocusing, which causes an undesirable increase in the size of the spot image at the substrate. Lateral chromatic aberration refers to a change in the image height on the substrate as a function of wavelength, which causes a shift in the position of the spot image on the substrate.

Various approaches have been proposed to control the effect of this wavelength variation problem. One approach utilizes a temperature control device to ensure that the temperature of the semiconductor device remains fixed. This is acceptable for small scale applications, however in mass-production the added expense of the temperature control apparatus makes this approach costly. A more cost effective approach is to use an achromatic lens system which minimize the detrimental effects of the wavelength variations to acceptable levels. Designs using this approach are shown, for example, in U.S. Pat. Nos. 5,086,350, 5,247,385 and 5,270,851.

One drawback of the achromatic lens approach is that it substantially increases manufacturing costs by requiring the use of multiple glass types with different dispersion characteristics. Another drawback of this approach is that it increases the number of lens elements required to maintain acceptable optical performance. This is a problem because increasing lens elements undesirably increases the weight of the system and its manufacturing cost. A still further drawback of the achromatic lens approach is that it places restrictions on manufacturing by limiting the glass combinations that can be used in building lens elements. Further, these lens elements generally require relatively expensive materials, because they often utilize costly optical materials with high refractive indices to help minimize aberrations. These above drawbacks make the prior art achromatic lens approach less desireable.

SUMMARY OF THE INVENTION

Accordingly, it is an object of this invention to provide an improved optical system for scanning a beam wherein one or more of the foregoing problems or drawbacks are eliminated.

Briefly described, an optical system embodying the invention includes a laser source for emitting a beam along a first path and a deflector, such as a rotating polygonal mirror, intersecting the first path for translating the beam into a scanning beam which moves along a second path in a scan plane. A (F-θ) lens system is present in the second path having first and second elements for focusing the scanning beam in an image plane transverse to the scan plane. These first and second elements each comprise at least one body having a non-toric lens. The body of at least one of these first and second elements also provides a diffractive element. Thus, the diffractive element in the lens system may be on either the first or second elements, or diffractive power may be spread to diffractive elements on both first and second elements. The diffractive element(s) can provide correction of astigmatic and also chromatic aberration of the scanning beam.

The above lens system has an optical axis and a focal length F in the scan plane in which the deflector moves the beam along the second path at a scan angle θ with respect to the optical axis, and the scan angle θ varies responsive to the deflector movement to provide the scanning beam. The image plane is spaced from the lens system (i.e., its second principle point) by the focal length F. By orienting the first and second lens groups, the scanning beam is focused onto the image plane having a lateral position (y) from the optical axis in the scan plane based upon the focal length F and scan angle θ (i.e., y≈F·θ).

The optical system may further have a third lens element in the first path of the beam prior to the deflector. This third element provides for focusing the beam such that the second path of the beam is focused in a cross-scan plane substantially perpendicular to the scan plane. Optionally, this third lens element may be a body having another diffractive element. This diffractive element can correct chromatic and spherical aberration in the cross-scan plane of the scanning beam.

Additionally, the optical system can include another lens intersecting the first path of the beam prior to the deflector for substantially collimating the beam from the laser source.

BRIEF DESCRIPTION OF THE DRAWINGS

The foregoing and other objects, features and advantages of the invention will be better understood from a reading of the following description in connection with the accompanying drawings in which:

FIGS. 1A and 1B is a plane geometry model of a laser beam from a scanning deflector;

DETAILED DESCRIPTION OF THE INVENTION

Figure 4:
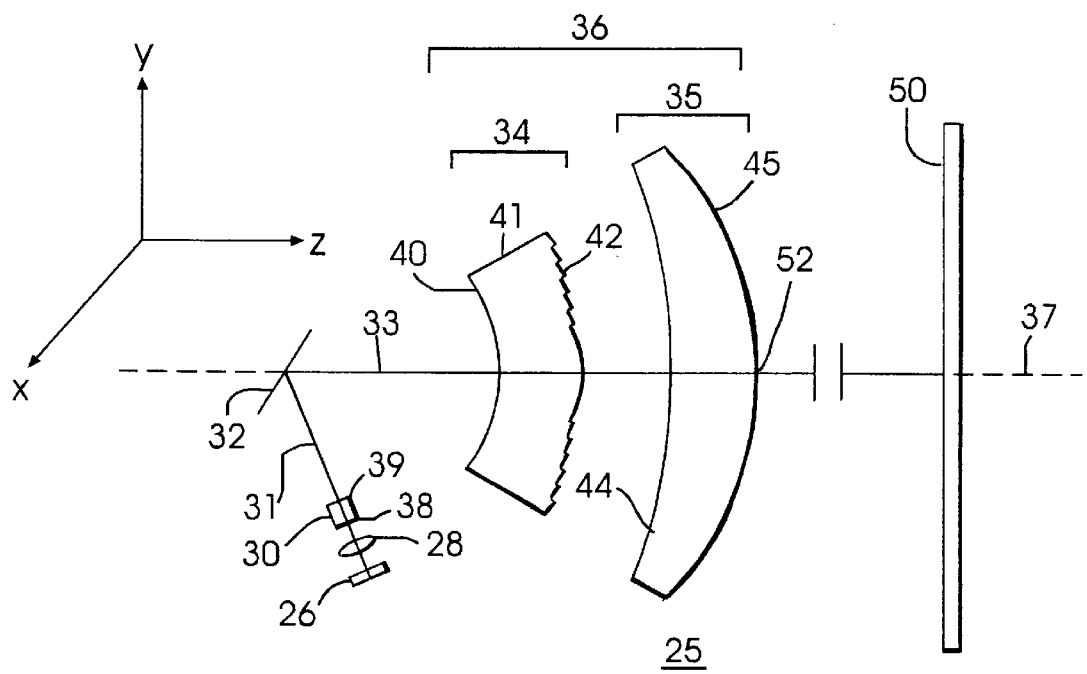
FIG. 4 is a diagram of an optical scanning system in accordance with the present invention.

Referring to FIG. 4, an optical scanning system 25 according to the present invention is shown. In describing system 25, the plane geometries defined earlier in FIGS. 1A and 1B for the scan, cross-scan and image planes will be referred to. System 25 includes a laser source 26 which emits a laser beam along a first path 31. This laser source 26 may be of the semiconductor laser diode type and can operate at wavelengths defined later herein. A collimator lens 28, a cylindrical lens element 30 and a scanning deflector 32 (a mirror pivotable about an axis perpendicular to the scan plane) are provided which intersect the beam along its first path 31. The beam from laser source 26 incident on collimator lens 28 is substantially collimated by collimator lens 28 before passing through the cylindrical lens element 30, which focuses the beam into a line image on the mirror surface of deflector 32.

Cylindrical lens element 30 focuses only in the cross-scan plane, and consists of a cylindrical refractive lens 38 with a diffractive lens 39 on one or both surfaces of lens 38. Preferably, lens 38 is a piano-cylindrical type lens with diffractive lens 39 on the piano surface of lens 38. Diffractive surface 39 provides a diffractive phase profile which is optimized to promote proper correction of longitudinal chromatic aberration and spherical aberration of the laser beam in the cross-scan plane. Optionally, other types of cylindrical lens elements without a diffractive lens may be used, such as a standard doublet, however such elements may not provide the described laser beam correction. Diffractive lens 39 may be provided by a kinoform lens, an annular blaze or profile, or may be holographically formed either on or internally of the body of lens 38.

The beam from cylindrical lens element 30 intersects scanning deflector 32, which may be a multi-facet rotating polygon mirror, an oscillating mirror, or even a rotatable grating (commonly known as a hologon). The mirror surface (s) of the deflector 32 are tilted to reflect the beam from first path 31 along a second path 33 in the scan plane. The beam along this second path is also referred to as the scanning beam. In this second beam path 33 are provided a first lens element 34, a second lens element 35 and a substrate 50, which has a surface facing deflector 32 lying in an image plane. This image plane, also called the focal plane, need only be transverse to the scan plane, and accordingly is not limited to being a plane which is perpendicular to the scan plane or the cross-scan planes (at zero scan angle). Substrate 50 may be a photosensitive material, but may also be a reflective (such as in bar code scanning) or transmissive (such as in defect detection scanning) surfaced material.

The first and second lens elements 34 and 35 are oriented along a common optical axis 37 extending through the center of the scan on substrate 50. The position of the beam in second path 33 with respect to optical axis 37 in the scan plane defines scan angle θ (as earlier shown in FIGS. 1A and 1B where the z-axis represents optical axis 37). Scanning deflector 32 moves the beam along its second path 33 at scan angle θ, accordingly scan angle θ varies responsive to deflector 32 movement to provide the above mentioned scanning beam. This scanning beam is incident on the first and second elements 34 and 35. Also, the scanning beam in second path 33 is at an incident angle (alpha) to the first path 32 when scan angle θ=0, i.e., second path centered on optical axis 37. Typically this incidence angle is at about 60 degrees, however other angle values may be used.

The optics provided by the first and second elements 34 and 35 are referred to as a F-θ lens system 36. F-θ lens 36 has a focal length F in the scan plane. The focal length F is approximately given by the distance from the second principal point of F-θ lens 36 in the scan plane to the image plane. The position of this second principal point can be readily calculated by those skilled in the art of optics. The focal length F is also called the effective focal length. The surface of substrate 50 facing the deflector 32 is spaced at a distance from F-θ lens 36 (i.e., its second principle point) by focal length F. First lens element 34 consists of a first cylindrical lens surface 40 and a second spherical lens surface 41 having a diffractive element or surface 42 thereon. Diffractive surface 42 shown in FIG. 4 is illustrative and not drawn to scale. Diffractive surface 42 may be provided by a kinoform lens, an annular blaze or profile, or may be holographically formed either on or internally of the body of lens 41. Second lens element 35 has a first cylindrical lens surface 44 and a second spherical lens surface 45. Neither of these lens elements 34 or 35, nor any other lens in system 25 has a toric surface, which differs from the prior art optical scanning systems requiring at least one toroidal or toric surface. The scanning beam is focused by F-θ lens 36 into a nearly diffraction-limited spot (or oval depending on the orientation of the image plane) having a lateral position y from optical axis 37 in the scan plane approximated by the equation y=F·θ.

Note that the term "lens element" used in describing system 25 (and also later in system 25a) refers to one or several lenses having different surfaces which provide the desired optical focusing or translation of a beam incident thereupon. Thus, first and second elements 34 and 35 may each comprise a group of lenses instead of the single lens body shown in FIG. 4. Further note that all of the lenses described in system 25 may be made of the same material, such as of plastic (e.g., PMMA) or glass. This is in contrast to the prior art achromatic approaches which require at least two different lens materials.

In addition, collimator lens 28 in system 25 preferably has a small amount of overcorrected longitudinal chromatic aberration to compensate for the undercorrected longitudinal chromatic aberration of F-θ lens 36, as described, for example, in U.S. Pat. No. 5,270,851.

FIG. 4 shows diffractive surface 42 on first lens element 34 of F-θ lens 36 rather than on second element 35. One reason for this is that the diameter of first element 34 is significantly smaller than the second element 35 (e.g., approximately 70 mm versus 120 mm) and since the fabrication costs of diffractive surfaces usually increases with diameter, it should be more cost effective to place the diffractive surface on the smaller diameter first lens element. Another reason the diffractive surface is placed on the second surface 41 of first element 34 is that this surface is spherical, as opposed to the first surface 40 which is cylindrical. Diffractive surfaces can more readily be fabricated on a rotationally symmetric surfaces, such as surface 41, rather than a cylindrical surface, which may reduce manufacturing costs.

Figure 5A:
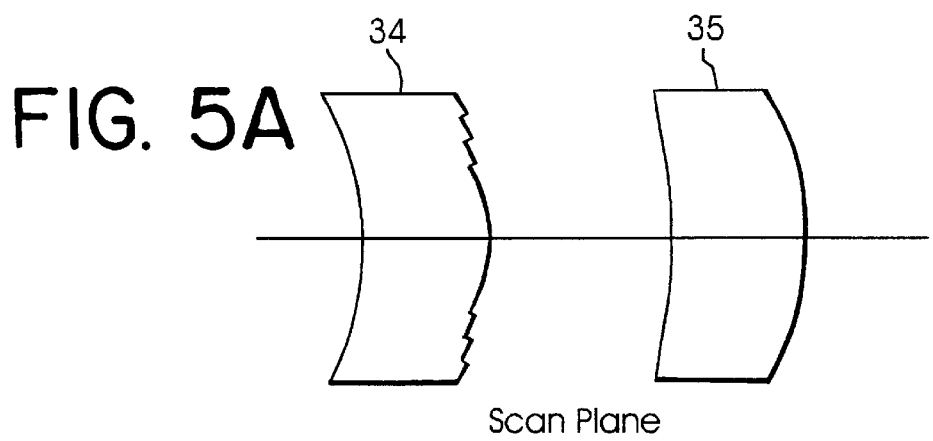
FIGS. 5A and 5B show the lens curvature of the F-θ lens in the system of FIG. 4 in the scan and cross-scan planes, respectively.
Figure 5B:
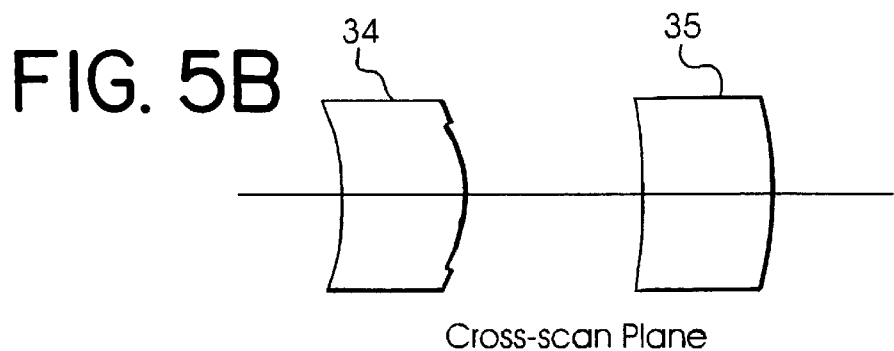

Referring to FIGS. 5A and 5B the lens curvature configuration for F-θ lens system 36 is illustrated in both the scan plane and the cross-scan planes, respectively, for first and second lens elements 34 and 35. Based on the lens curvature, F-θ lens 36 has greater optical power in the cross-scan plane than in the scan plane. This is due to the surfaces which are concave in the scan plane are planar in the cross-scan plane, and the remaining surfaces are convex and have the same curvature in each plane. The basic layout of the surface types (i.e., cylindrical, spherical) in F-θ lens system 36 is based on correcting both axial astigmatism and regular astigmatism without the use of a toric surface. Note that the diffractive surface 39 contributes only a small amount optical power (≅9% of the total surface power) which is calculated using Equation (2) shown below.

The discussion below will illustrate the manner in which the surface profile of the diffractive elements in system 25 are determined to provide an optical scanning system with an F-θ lens system which requires neither a toric surface to correct for astigmatism of the scanning beam, nor multiple glass types to provide an achromatic F-θ lens, as required in prior art optical scanning systems. After this discussion, two embodiments of system 25 and an embodiment to an alternative F-θ lens design will be described. The first embodiment of system 25 accounts for the effects of wavelength variation of laser source 26, while the second embodiment of system 25 has laser source 26 having nearly monochromatic operation, i.e., minimal wavelength variation. The embodiment to an alternative F-θ lens also has a laser source 26 having nearly monochromatic operation.

A rotationally symmetric diffractive surface can be modeled by the following equation:

$$\Phi(r) = \sum_{i=1}^{M} \alpha_i r^{2i}, \tag{1}$$

where $\Phi(r)$ represents the phase delay imparted on the wavefront at the radial position, r, M is the total number phase terms, and ($\alpha_i$ are the diffractive phase coefficients. Since the coefficients are chosen independently, they each represent a degree of freedom in the design process. Their values can be optimized automatically using a commercial lens design program. The first term corresponds to the paraxial power and its primary effect is to help correct chromatic aberration for systems that utilize semiconductor lasers which are not temperature controlled. The paraxial power is given by $$\Phi_{diff} = -\alpha_1 \lambda m/\pi, \tag{2}$$

where λ is the operating wavelength and m is the diffraction order. Preferably, m is equal to one. The linear dependence on wavelength allows for chromatic aberration correction when the diffractive surface is combined with a refractive lens and the lens powers are properly balanced. The second term, which has a quartic dependence on aperture, is used to help correct coma, astigmatism, and third order spherical aberration. The remaining terms are used for correction of coma and astigmatism, which includes higher-order contributions to these aberrations including elliptical coma.

A non-rotationally symmetric diffractive surface can be modeled by the following equation:

$$\Phi(x, y) = \sum_{ij} b_{ij} x^i y^j, \tag{3}$$

where $\Phi(x,y)$ represents the phase delay imparted on the wavefront at the lateral position, x, y, and $b_{ij}$ are the diffractive phase coefficients. Since the coefficients are chosen independently, they each represent a degree of freedom in the design process. Their values can be optimized automatically using a commercial lens design program. The paraxial power of this surface is, in general, different along the x and y axes. It is assumed that for an F-θ lens system, the x and y axes are defined in this discussion to lie in the cross-scan plane and the scan plane, respectively. In general, the paraxial power is different in each of these planes. These powers are given by $\Phi_{diff,s} = -b_{02}\lambda m/\pi$ and $\Phi_{diff,c} = -b_{20}\lambda m/\pi$, corresponding to the scan plane and cross-scan plane, respectively. For systems that utilize semiconductor lasers which are not temperature controlled, the primary effect of these paraxial power terms is to help correct chromatic aberration. The higher order terms perform similar functions as those for rotationally symmetric diffractive surfaces but with the additional ability to directly control the astigmatic properties of the beam. This direct control results from the toroidal nature of the phase function given by Equation (3) and in this regard is similar to that of a standard refractive toric surface. In fact this type of diffractive surface can be used to help correct axial astigmatism.

Equation (3) can also be used to describe a one-dimensional diffractive profile for which the phase varies along only one axis. This cylindrical phase function can be generated by forcing all of values of the coefficients to be zero except for those given by $b_{i0}$, or $b_{0j}$. A one-dimensional diffractive surface can be placed, for example, on the cylindrical lens which forms a line image on the polygon mirror, to help provide color correction in the cross-scan plane. Higher order terms can be used to optimize the spherical aberration introduced by this lens to provide the best final image quality at the substrate.

The correction of chromatic aberration for a laser-diode source using diffractive optics will now be described. Longitudinal chromatic aberration refers to the change in image-plane position as a function of wavelength. For most scan lenses it is reduced if the following condition is satisfied, $$\sum_{i=1}^{N} \frac{\phi_i}{v^i} \approx 0, \tag{4}$$

where i corresponds to the lens elements, N equals the total number of lens elements, $\phi_i$ and $v_i$, represent the power and the Abbe number of the $i^{th}$ lens, respectively. The Abbe number for a refractive lens is given by $$v = (n_2 - 1)/(n_1 - n_3), \tag{5}$$

where $n_1$, $n_2$, and $n_3$, are the refractive indices at three reference wavelengths, $\lambda_1, \lambda_2,$ and $\lambda_3$, respectively, within the spectral region of interest. For visible applications, where color correction is required across a large spectral region, wavelengths $\lambda_1$, $\lambda_2$, and $\lambda_3$ are conventionally chosen to be 486 nm, 589 nm, and 656 nm, respectively. For a semiconductor laser system, the operating bandwidth is much smaller and centered around a specific central wavelength. Appropriate values for a diode laser system with a central operating wavelength of 780 nm, are $\lambda_1$=775 nm, $\lambda_2$=780 nm, and $\lambda_3$=785 nm. For these reference wavelengths the Abbe numbers for typical optical materials have values in the range of 700 to 2500. The Abbe number for a diffractive surface can be expressed as $$\nu_{diff} = \lambda_2 / (\lambda_3 - \lambda_2), \tag{6}$$

which yields a value of $\nu_{diff}$=-78. The noticeable difference in sign and magnitude of the Abbe number between refractive materials and a diffractive surface leads to unique achromatic lens designs. For a system composed of a single refractive lens and single diffractive lens, Equation (4) implies that both of the lenses must have positive power and that the refractive lens power is typically 20 times that of the diffractive lens. By comparison, if the system is composed of two refractive lenses, Equation (4) implies that the lenses must be of opposite sign and the magnitude of the powers can differ by at most a factor of 3.5. This means that the refractive lens powers must be significantly greater than the total lens power in order to achieve color correction. This leads to greater surface curvatures which leads to worse aberration control.

If the longitudinal chromatic aberration is corrected, transverse chromatic aberration can be viewed as a change of focal length in the scan plane as a function of wavelength. In other words, if rays of differing wavelengths come to focus in the same focal plane and also exhibit transverse chromatic aberration, the principal planes for the different wavelengths must not be at the same location. This implies that the focal lengths are not the same and using the relation, $y(\lambda)=F(\lambda)\theta$, the image heights will not be the same either.

Figure 2:
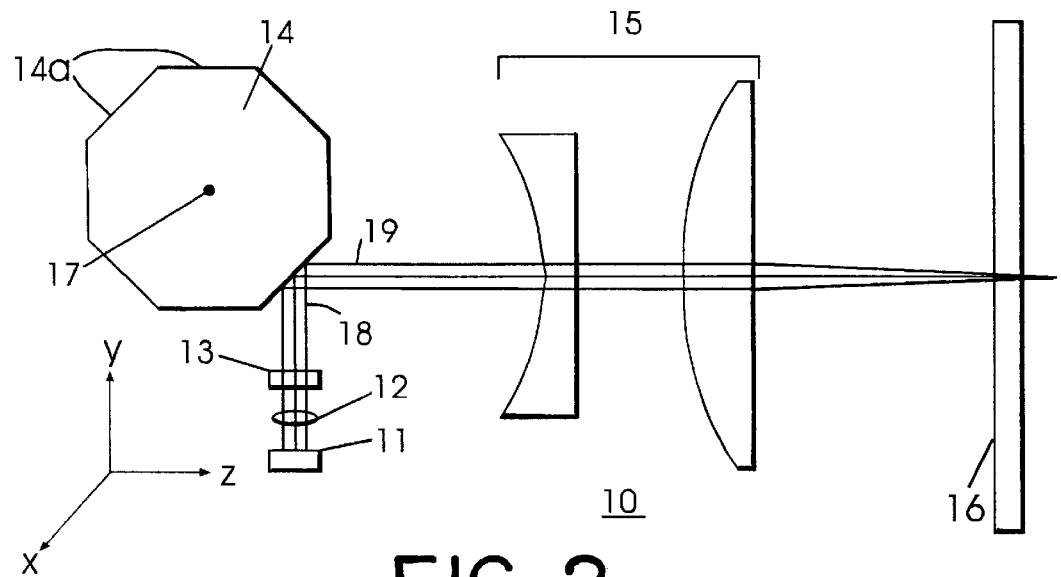
FIG. 2 is a diagram of an optical scanning system of the prior art.
Figure 3A:
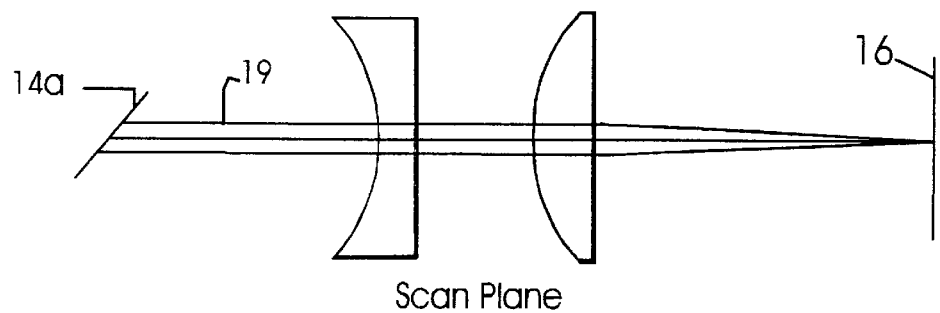
FIGS. 3A and 3B are illustrations of the scanning beam paths of the prior art system of FIG. 2 in the scan and cross-scan planes, respectively.
Figure 3B:
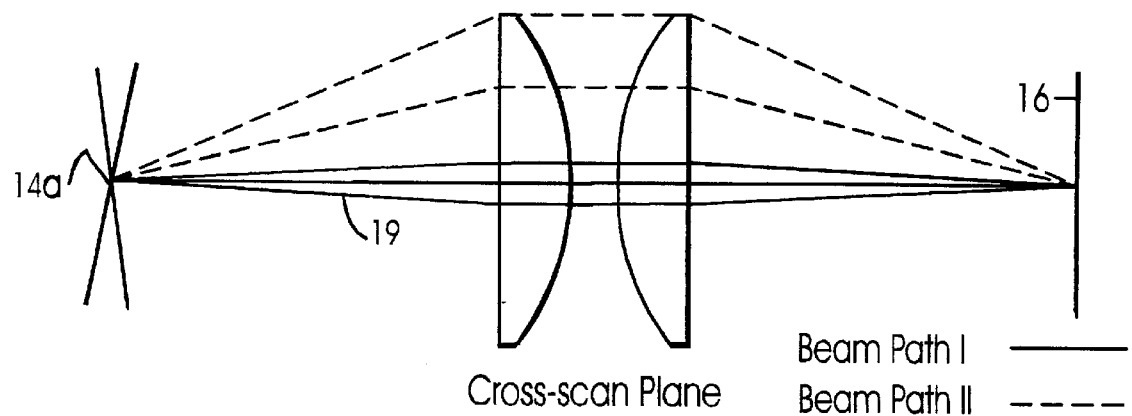
Figure 6:
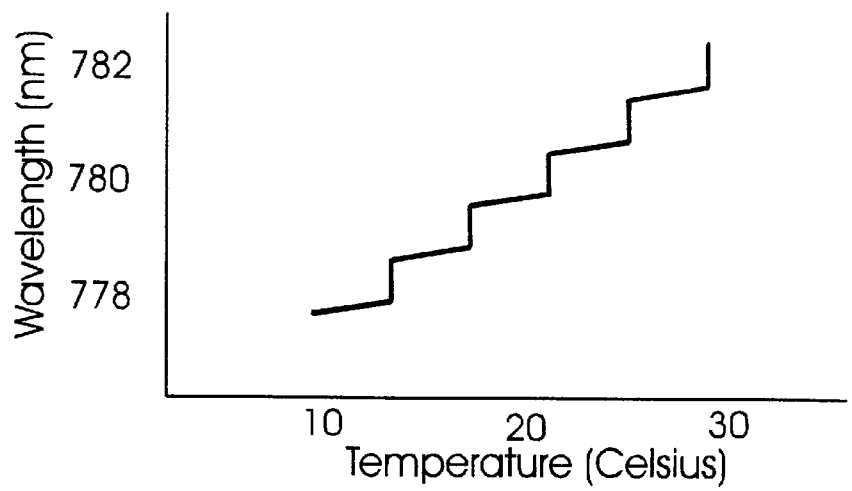
FIG. 6 is a chart of the typical effect of temperature of the laser source on the wavelength of its output beam.

Transverse chromatic aberration need not be entirely corrected across the 10 nm bandwidth. This assumes that temperature changes occur relatively slowly so that no noticeable effects of a slightly misplaced image spot can be discerned in the final scanned image. There is a critical requirement, however, when the laser diode source produces a discontinuous change in wavelength due to a phenomenon known as mode hopping. This mechanism is caused by a discrete change in the effective cavity length of the laser and its effect on the spectral output illustrated in FIG. 6. The jumps which typically have a value of 1 nm occur quite frequently across a 50 degree range. The image displacement due to these mode hops must be a small fraction of the spot size so that no noticeable discontinuities are evident in the final scanned image. Using diffractive optical surfaces, this effect can be achieved.

Petzval field curvature is dependent only on the surface powers and the refractive indices. It can be reduced if the following condition is satisfied, $$\sum_{i=1}^{N} \frac{\phi_i}{n_i n'_i} \approx 0, \tag{7}$$

where i corresponds to the lens surfaces, N is the total number of lens surfaces, $\phi_i$ is the surface power, and $n_i$ and $n_i'$ are the refractive indices before and after the surface, respectively. A diffractive lens does not contribute to the Petzval curvature and, therefore, is not included in the above calculation. This invariance with respect to Petzval curvature allows for additional freedom in designing scan lenses with flat fields.

Correction of axial astigmatism is dependent primarily on the layout of the refractive lenses in the scan and the cross-scan planes. The diffractive lens power is typically small due to the correction of chromatic aberration and does not have a large effect on the total lens power. It is relatively easy to select combinations of spherical and cylindrical surfaces in the F-θ lens system to form a focused image at the substrate in both the scan and the cross-scan planes. However, correction of astigmatism for off-axis points in the scan plane places a significant limitation on the design forms which will work. Using even a single toric surface in the system, as opposed to using only spherical and cylindrical surfaces, significantly reduces the number of elements. This is because a toric surfaces allows direct control of the power in the scan plane and the cross-scan plane.

In system 25, diffractive surface affects the astigmatism in a markedly different manner than a refractive lens. The independent higher-order phase terms also allow aspheric correction of the wavefront that is not possible in the refractive designs which use spherical surfaces only. These factors make it possible to design F-θ lenses that do not require a toric surface.

The design of diffractive surface profiles in system 25 is discussed below. After the diffractive phase coefficients are determined, the physical surface-relief profile of the diffractive element can be determined using the following equation:

$$h(r) = \frac{p\lambda_0}{n-1} \left( 1 - \sum_{i=1}^{M} a_i r^{2i} / 2\pi p \right), \tag{8}$$

where h(r) represents the sag of the diffractive profile, r is the radial distance from the optical axis, p and 1 are positive integers, $\lambda_0$ is a design wavelength, and n is the refractive index of the actual material of the diffractive lens at the design wavelength. The sag is measured along the chief ray in the scan plane irrespective of the shape of the substrate i.e., piano, convex, or concave. Slight modifications can be made to account for fabrication restrictions. The physical surface relief profile for a non-rotationally symmetric diffractive surface can be written in a similar manner as $$h(r) = \frac{p\lambda_0}{n-1} \left( 1 - \sum_{ij} b_{ij} x^i y^j / 2\pi p \right). \tag{9}$$

Embodiment 1

The design of cylindrical lens element 30 and first and second lens element 34 and 35 of F-θ lens system 36 for an Embodiment 1 of system 25 is shown, for example, in Table I, where surfaces 1–7 correspond to surfaces 38, 39, 32, 40, 41/42, 44, and 45 of FIG. 4. The units of length are in millimeters (mm). Rscan is the radius of curvature in the scan plane, Rcross is the radius of curvature in the cross-scan plane, t is the axial distance to the next surface, and index is the refractive index of the medium following the surface at the operating wavelength. Abbe2 and Abbe1 are the Abbe numbers calculated for refractive surfaces using Equation (5). Abbe1 is calculated using the wavelengths, $\lambda_1$, $\lambda_2$, and $\lambda_3$ of 775 nm, 780 nm, and 785 nm, respectively. Abbe2 is calculated using the wavelengths, $\lambda_1$, $\lambda_2$, and $\lambda_3$ of 486 nm, 589 nm, and 656 nm, respectively. Abbe1 and Abbe2 are not shown for diffractive surfaces in Table 1 because their values depend only on the operating wavelengths of the system. The focal length given corresponds to the scan plane. The diffractive phase coefficients correspond to those defined in Equation (1).

TABLE 1

Focal length = 234.2 mm, scan angle = +/−27 degrees
Incidence angle = alpha = 60 degrees
F/30 (scan plane), F/60 (cross-scan plane)
Inscribed Polygon Diameter = 80 mm
Operating wavelength = 780 nm (+/−5 nm)

| Surface | Rscan | Rcross | Thickness | Index | Abbe 1 | Abbe 2 |
|---|---|---|---|---|---|---|
| 1 | ∞ | 57.026 | 6.32 | 1.7656 | 1012 | 25.76 |
| 2* | ∞ | ∞ | 63.801 | 1.0000 | — | — |
| 3 | ∞ | ∞ | 52 | mirror | — | — |
| 4 | −51.206 | ∞ | 16.979 | 1.7656 | 1012 | 25.76 |
| 5** | −79.129 | −79.129 | 40 | 1.0000 | — | — |
| 6 | −404.186 | ∞ | 17.722 | 1.7656 | 1012 | 25.76 |
| 7 | −108.324 | −108.324 | 298.409 | 1.0000 | — | — |

*Diffractive Phase Coefficients – One Dimensional:
Surface 2: $a_1 = -6.344260414$, $a_2 = 1.6619739 \times 10^{-2}$
**Diffractive Phase Coefficients – Rotationally Symmetric:
Surface 5: $a_1 = -4.52998346$, $a_2 = 5.659955 \times 10^{-4}$, $$a_3 = 2.6143 \times 10 \times 10^{-7}$$

Figure 7:
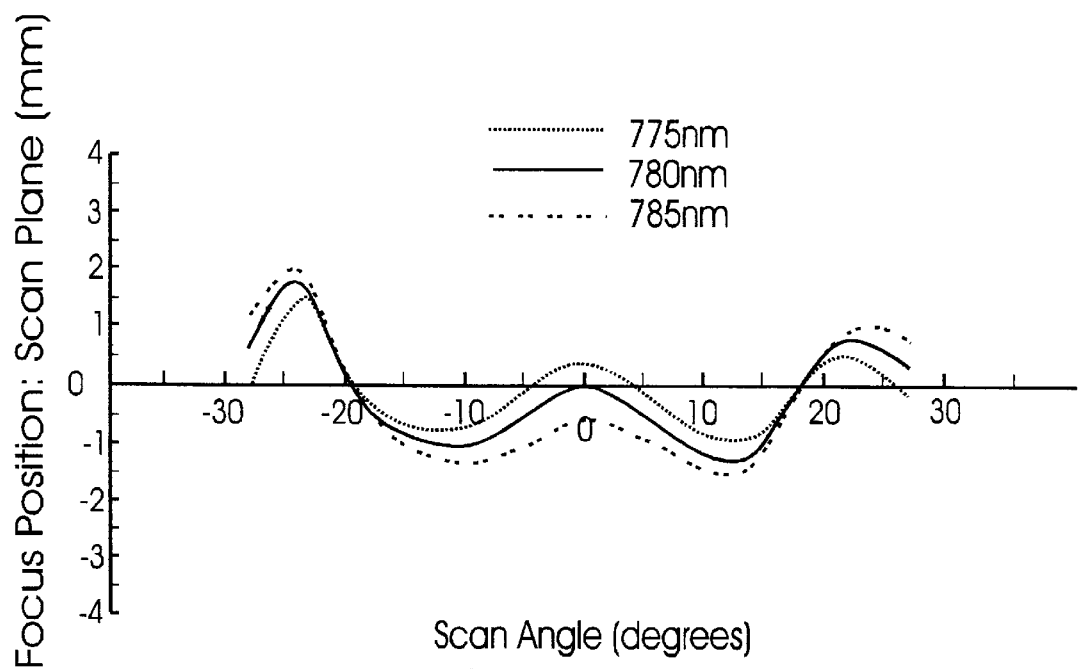
FIG. 7 is a chart illustrating the focus position of the scanning beam in the scan plane over a range of scan angles, in accordance with a first embodiment (Embodiment 1) of the system of FIG. 4.
Figure 8:
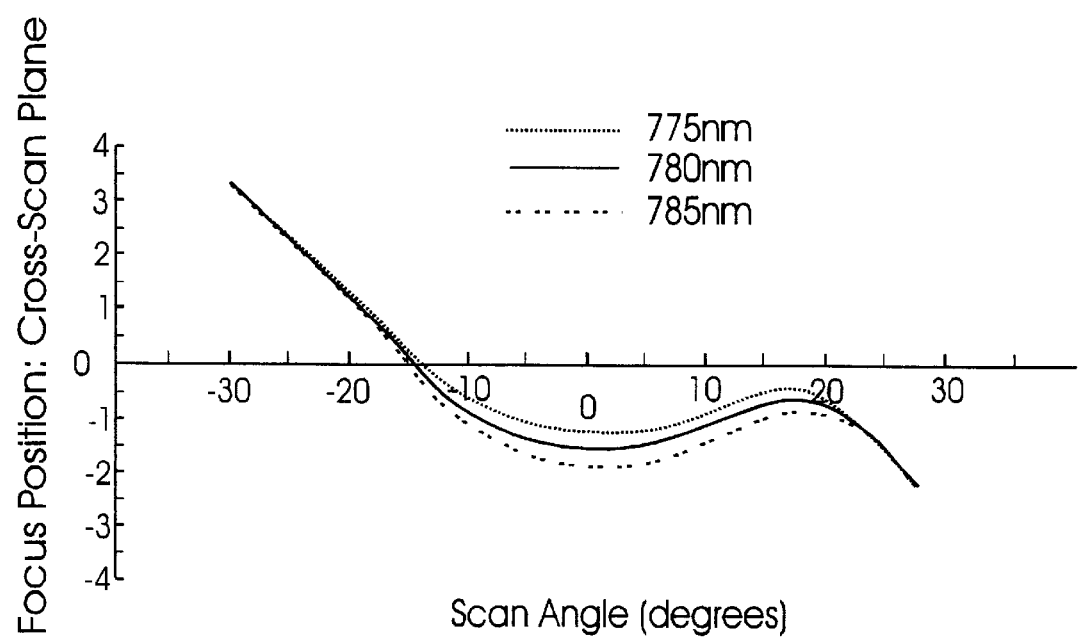
FIG. 8 is a chart illustrating the focus position of the scanning beam in the cross-scan plane over a range of scan angles, in accordance with Embodiment 1 of the system of FIG. 4.
Figure 9:
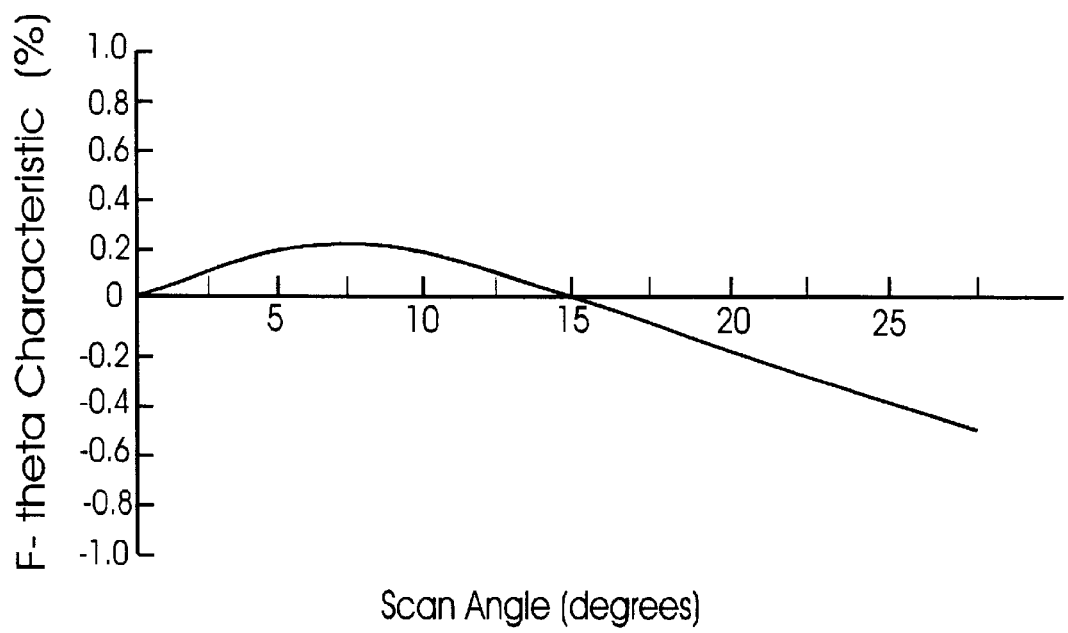
FIG. 9 is a chart of the F-θ characteristic in accordance with Embodiment 1 of the system of FIG. 4.

Based on the parameter of Table 1, the performance of system 25 is illustrated in FIGS. 7, 8 and 9. FIG. 7 is a chart of the focus position in the scan plane of the scanning beam relative to substrate 50 (i.e., the image plane) for scan angle θ range between about ±30 degrees from optical axis 37 of F-θ lens system 36. The plot is of three operating beam wavelengths from laser source 26: 780 nm, 775 nm, and 785 nm. For these wavelength, the focus position in the scan plane only varies within about 2 mm to −1.5 mm. FIG. 8 is a chart of the focus position in the cross-scan plane of the scanning beam relative to substrate 50 (i.e., the image plane) for the same scan angle range and beam wavelengths shown in FIG. 7. This chart shows that the focus position in the cross-scan plane only varies between 3 mm and −2 mm. FIG. 9 shows the % error of system 25 in terms of its F-θ characteristic, which is defined as F-θ characteristic=100%*(Y−Fθ)/(Fθ), where Y is equal to the actual chief ray image height in the scan plane. In Embodiment 1, the F-θ characteristic of system 25 with F-θ lens system 36 is less than ±1% over the scan angle range.

Performance results further show that the maximum shift in the image position across the 10 nm wavelengths bandwidth (775 nm to 785 nm) is 20 microns. The maximum positional shift for 1 nm wavelength change, typical for a single mode hop, is 2 microns. In addition, the gaussian beam diameter, defined as the diameter at which the intensity drops to a value which is 1/e² times the value at the center of the beam, is approximately 42 microns in the scan plane. The image shift due to a mode hop is therefore approximately 1/10 of the spot size. This illustrates that system 25 of Embodiment 1 substantially corrects chromatic aberration of the scanning beam, and hence is sufficiently robust to accommodate wavelength variation which may be caused by temperature changes of laser source 26.

Performance of the F-θ lens 36 of system 25 may also be evaluated based on optical resolution. The optical resolution of the F-θ lens 36 in units of dots per inch (dpi) in the scan plane can be calculated based on one of several different criteria. Typical criteria include: (a) the reciprocal of the gaussian beam diameter; (b) the reciprocal of the diameter at which the intensity drops to a value which is equal to one-half of the value at the center of the beam; and (c) one-half of the reciprocal of the spatial frequency at which the Modulation Transfer Function (MTF) falls to a value of 0.5. Using the Table 1 example for Embodiment 1, the approximate values for the optical resolution of F-θ lens 36 based on criteria (a), (b) and (c) are 605 dpi, 980 dpi, and 860 dpi, respectively.

Embodiment 2

Embodiment 2 of system 25 is similar to Embodiment 1, except that laser source 26 remains nearly monochromatic during operation. This may be achieved, for example, with a laser source 26 having a temperature control unit (not shown in FIG. 4) to keep the temperature fixed. The design of cylindrical lens element 30 and F-θ lens system 36 for Embodiment 2 of system 25 is shown, for example, in Table 2 where surfaces 1–7 correspond to surfaces 38, 39, 32, 40, 41/42, 44 and 45. The system 25 parameters (unit length, Rscan, Rcross, t, index, Abbe1 and Abbe2) are the same as defined for Embodiment 1.

TABLE 2

Focal length = 234.5 mm, scan angle = +/−27 degrees
Incidence angle = alpha = 60 degrees
F/26 (scan plane), F/53 (cross-scan plane)
Inscribed Polygon Diameter = 80 mm
Operating wavelength = 780 nm

| Surface | Rscan | Rcross | Thickness | Index | Abbe 1 | Abbe 2 |
|---|---|---|---|---|---|---|
| 1 | ∞ | 54.373 | 6.32 | 1.7656 | 1012 | 25.76 |
| 2* | ∞ | ∞ | 63.477 | 1.0000 | — | — |
| 3 | ∞ | ∞ | 52 | mirror | — | — |
| 4 | −51.193 | ∞ | 18.817 | 1.7656 | 1012 | 25.76 |
| 5** | −80.208 | −80.208 | 40 | 1.0000 | — | — |
| 6 | −418.769 | ∞ | 20 | 1.7656 | 1012 | 25.76 |
| 7 | −109.624 | −109.624 | 306.026 | 1.0000 | — | — |

*Diffractive Phase Coefficients – One Dimensional:
Surface 2: $\alpha_1 = -6.344260414$, $\alpha_2 = 1.66197395 \times 10^{-2}$
**Diffractive Phase Coefficients – Rotationally Symmetric:
Surface 5: $\alpha_1 = -4.04800765$, $\alpha_2 = 5.6723207 \times 10^{-4}$, $$\alpha_3 = 2.83361 \times 10^{-7}$$

Figure 10:
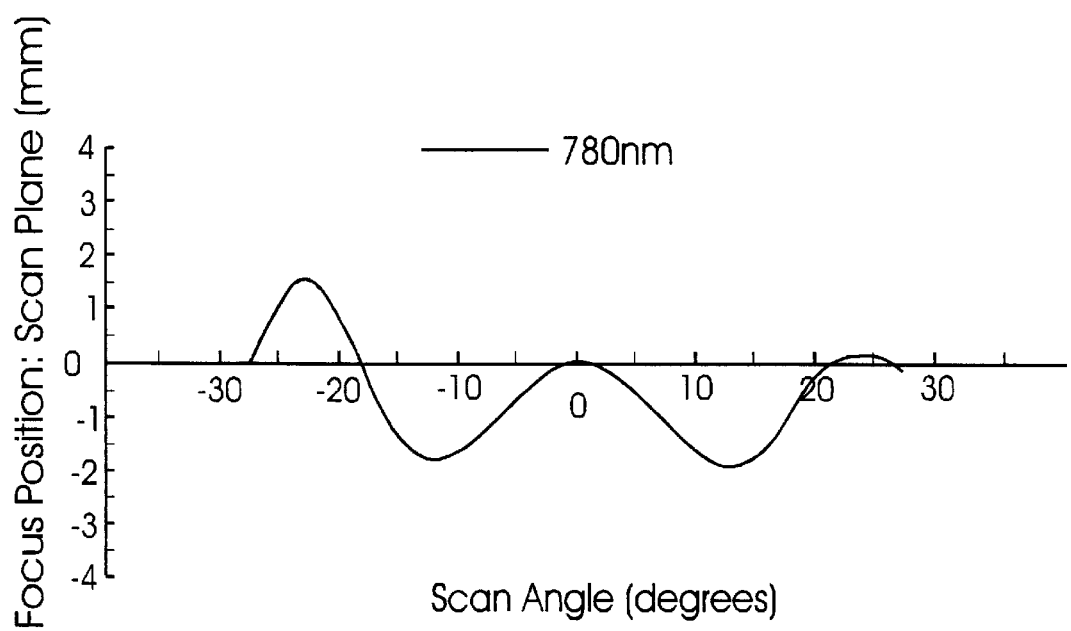
FIG. 10 is a chart illustrating the focus position of the scanning beam in the scan plane over a range of scan angles, in accordance with a second embodiment (Embodiment 2) of the system of FIG. 4.
Figure 11:
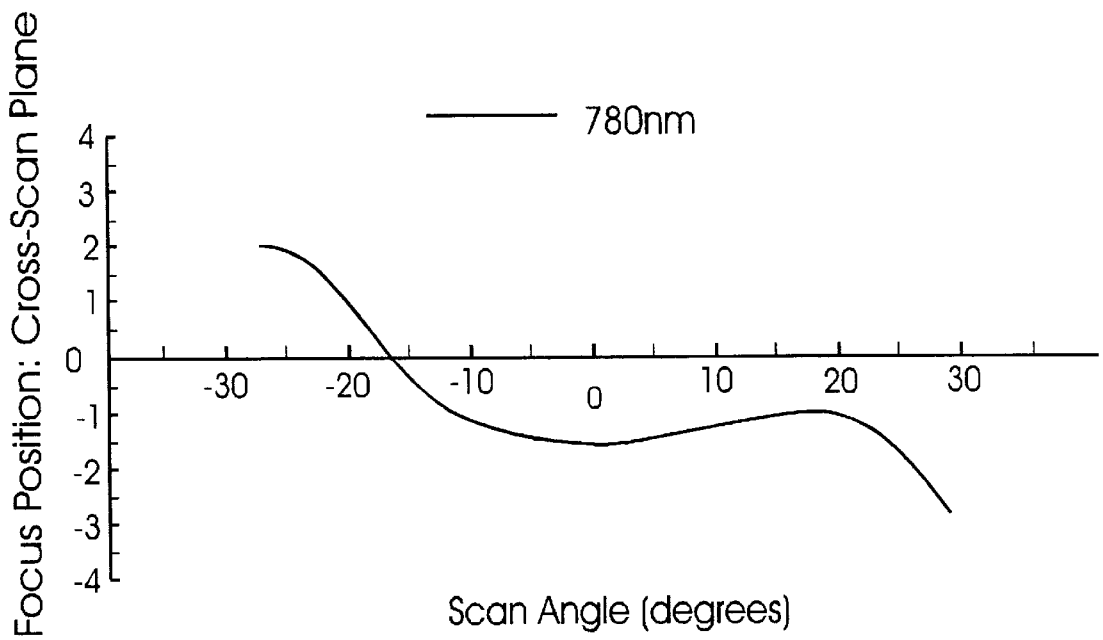
FIG. 11 is a chart illustrating the focus position of the scanning beam in the cross-scan plane over a range of scan angles, in accordance with Embodiment 2 of the system of FIG. 4.
Figure 12:
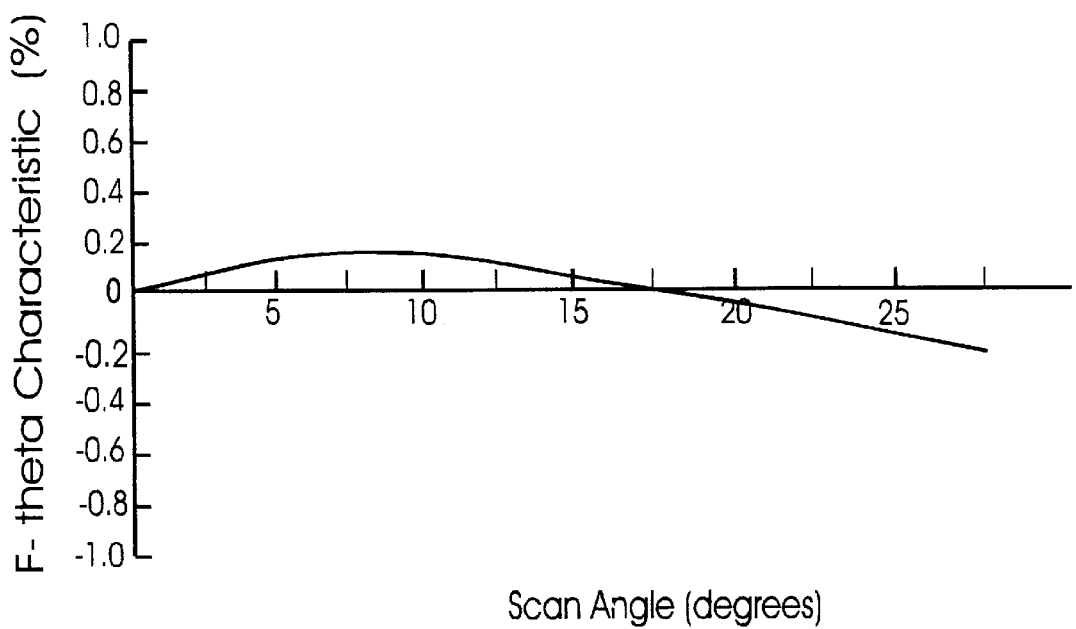
FIG. 12 is a chart of the F-θ characteristic in accordance with Embodiment 2 of the system of FIG. 4.

The performance of system 25 in Embodiment 2 are shown in FIGS. 10, 11 and 12, which are charts structured the same as FIGS. 7, 8 and 9, respectively, for a beam from laser source 26 with a wavelength of 780 nm. FIG. 10 shows that the focus position of the beam in the scan plane only varies between 1.5 mm and −2 mm from the image plane over the scan angle range. FIG. 11 shows that the focus position in the cross-scan plane only varies between 2 mm and −3 mm from the image plane over the scan angle range. FIG. 12 shows that the F-θ characteristic of system 25 is less than ±0.5% over the scan angle range.

Since chromatic aberration is not an issue in the Embodiment 2 design, the diffractive profile in F-θ lens 36 can be optimized to reduce the f-number of the system, as shown in Table 2. In addition, the gaussian spot diameter for system 25 has a value of approximately 37 microns.

Using the same criteria as in Embodiment 1 to calculate the optical resolution of the F-θ lens system in units of dots per inch (dpi) in the scan plane, the approximate values for the optical resolution based on criteria (a), (b) and (c) are 684 dpi, 1108 dpi, and 970 dpi, respectively.

Embodiment 3

Figure 13:
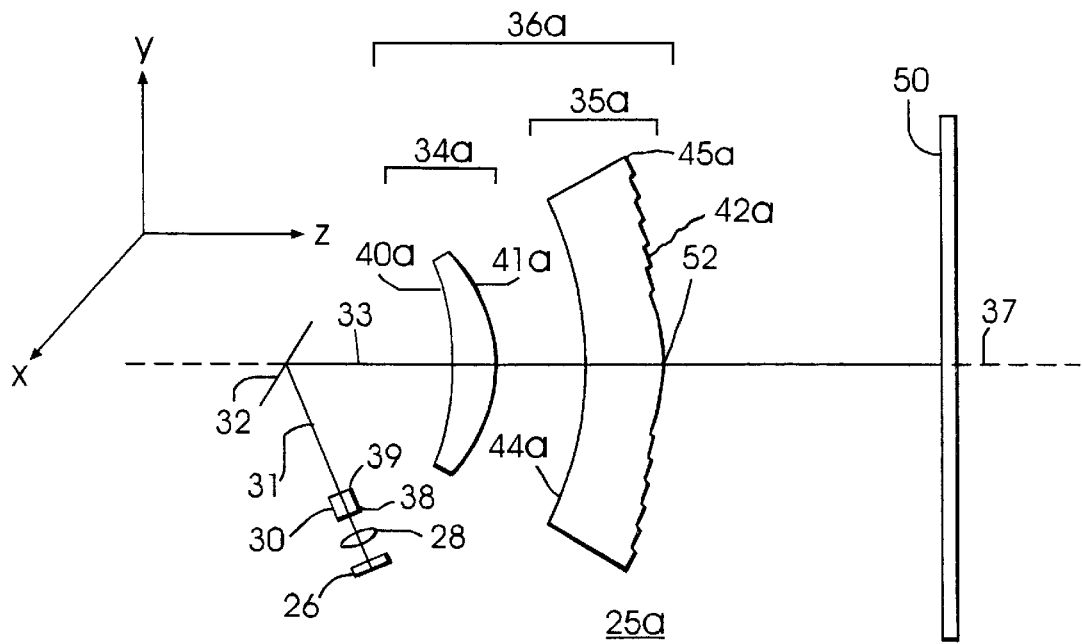
FIG. 13 is a diagram of an optical scanning system in accordance with the present invention having an alternative F-θ lens design (Embodiment 3)

Referring to FIG. 13, a system 25a in accordance with a third embodiment having an alternative F-θ lens design is shown. Elements of system 25a shown with like numeral are the same as those of system 25 (FIG. 4), and such elements operate similarly in both systems. The difference between system 25a and 25 is that in system 25a the location of the diffractive element in the F-θ lens is on the second lens element rather than on the first lens element. Specifically, the first and second elements 34a and 35a of F-θ lens system 36a each have a non-toric first cylindrical surface and a non-toric second spherical surface, 40a–41a and 44a–45a, respectively, in which the diffractive element or surface 42a is located on spherical surface 45a of the second element 35a. As with other described diffractive surfaces, surface 42a may be produced by kinoform, annular blaze or profile, or even holographically.

In Embodiment 3, like Embodiment 2, laser source 26 remains nearly monochromatic during operation, which may be achieved, for example, with a laser source 26 having a temperature control unit (not shown in FIG. 13) to keep the temperature fixed. The design of cylindrical lens element 30 and F-θ lens system 36a for Embodiment 3 is shown, for example, in Table 3. The parameters (unit length, Rscan, Rcross, t, index, Abbe1 and Abbe2) are the same as defined in the previous two embodiments.

TABLE 3

Focal length = 235 mm, scan angle = +/−27 degrees
Incidence angle = alpha = 60 degrees
F/23 (scan plane), F/47 (cross-scan plane)
Inscribed Polygon Diameter = 80 mm
Operating wavelength = 780 nm (+/−5 nm)

| Surface | Rscan | Rcross | Thickness | Index | Abbe 1 | Abbe 2 |
|---|---|---|---|---|---|---|
| 1 | ∞ | 96.756 | 6.32 | 1.7656 | 1012 | 25.76 |
| 2* | ∞ | ∞ | 76.761 | 1.0000 | — | — |
| 3 | ∞ | ∞ | 52 | mirror | — | — |
| 4 | −93.063 | ∞ | 15.026 | 1.7656 | 1012 | 25.76 |
| 5** | −159.327 | −159.327 | 40 | 1.0000 | — | — |
| 6 | −147.152 | ∞ | 5 | 1.7656 | 1012 | 25.76 |
| 7 | −316.014 | −316.014 | 284.380 | 1.0000 | — | — |

Figure 14A:
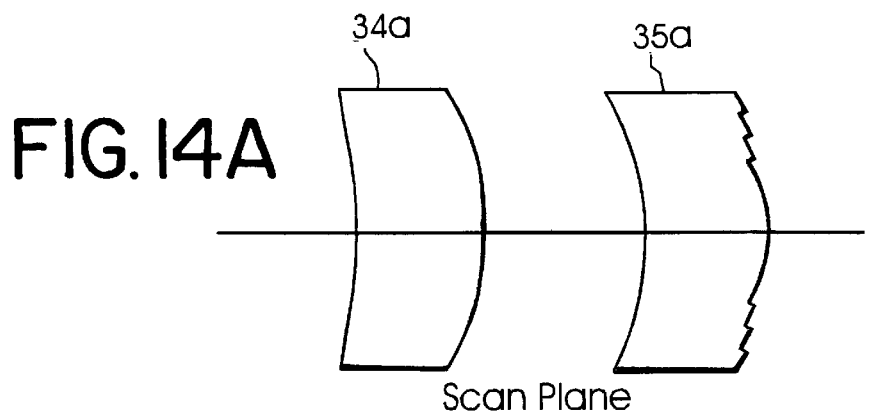
FIGS. 14A and 14B show the lens curvature of the F-θ lens in the system of FIG. 12 in the scan and cross-scan planes, respectively.
Figure 14B:
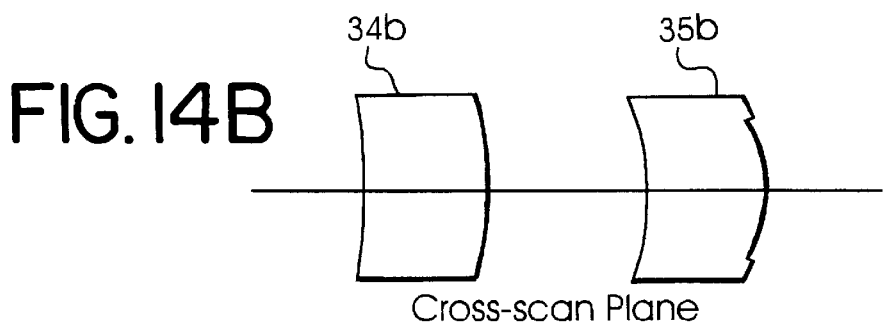

*Diffractive Phase Coefficients – One Dimensional:
Surface 2: $\alpha_1 = -20.74348867$, $\alpha_2 = 9.60782718 \times 10^{-3} - 5.35006197 \times 10^{-4}$
**Diffractive Phase Coefficients – Rotationally Symmetric:
Surface 5: $\alpha_1 = -34.872729973$, $\alpha_2 = 2.2147095 \times 10^{-5}$, $\alpha_3 = -1.429 \times 10^{-9}$ FIGS. 14A and 14B shows lens curvature configuration for F-θ lens system 36a in both the scan and the cross-scan planes, respectively. This is due to the surfaces which are concave in the scan plane are planar in the cross-scan plane, and the remaining surfaces are convex and have the same curvature in each plane. The basic layout of the surface types (i.e., cylindrical, spherical) in F-θ lens system 36a is based on correcting both axial astigmatism and regular astigmatism without the use of a toric surface. Note that the diffractive surface 39 in Embodiment 3 contributes approximately 78% of the total surface power.

Figure 15:
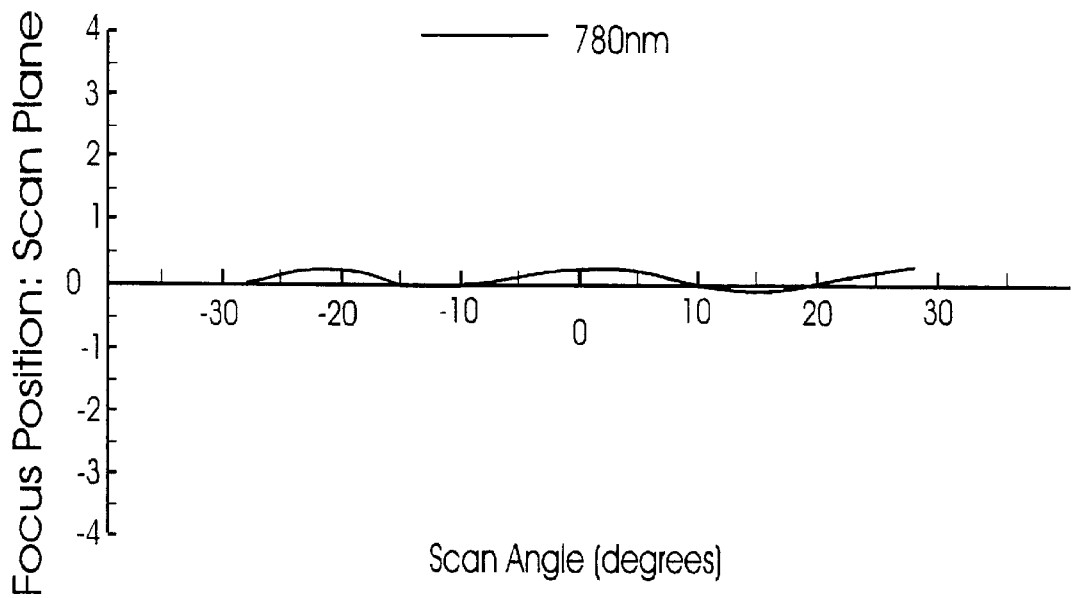
FIG. 15 is a chart illustrating the focus position of the scanning beam in the scan plane over a range of scan angles, in accordance with the system of FIG. 13.
Figure 16:
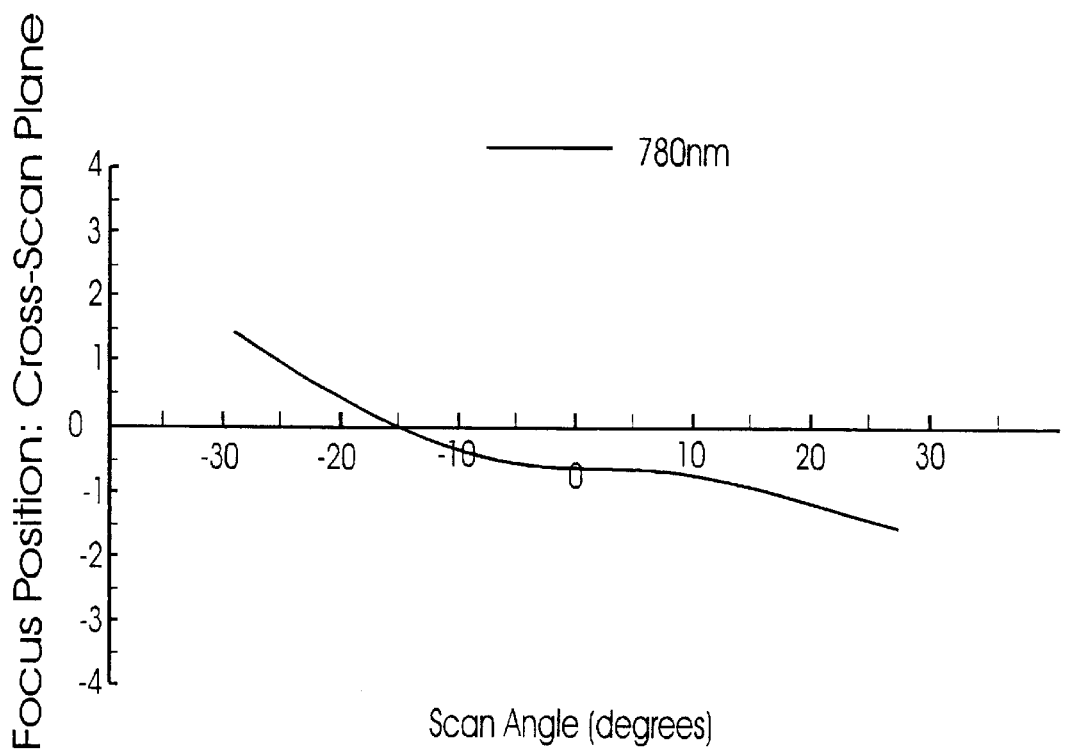
FIG. 16 is a chart illustrating the focus position of the scanning beam in the cross-scan plane over a range of scan angles, in accordance with the system of FIG. 13.
Figure 17:
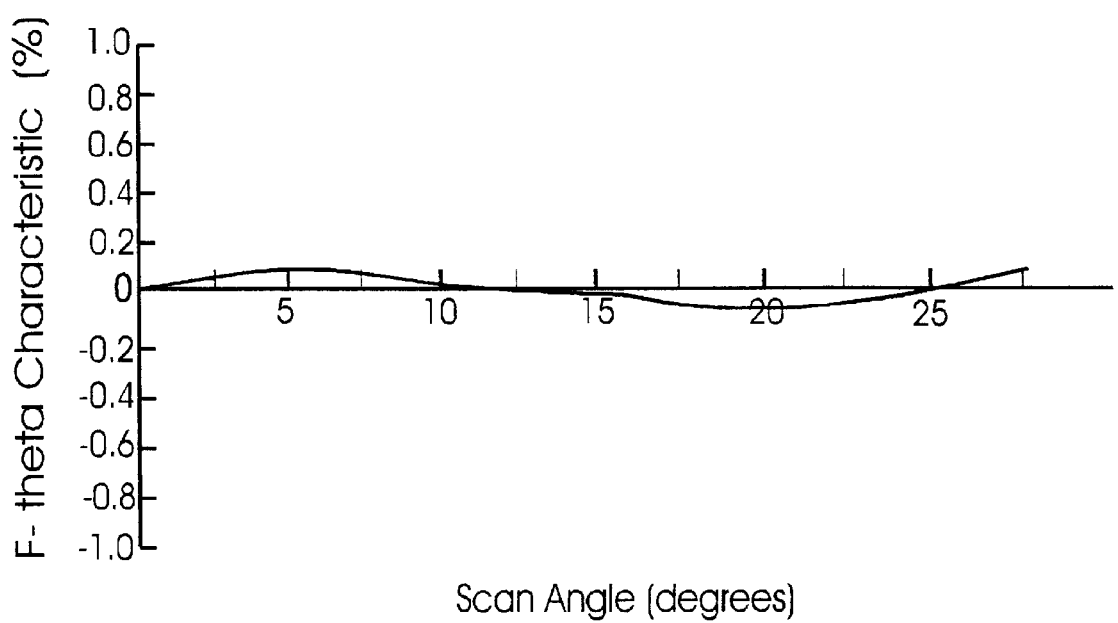
FIG. 17 is a chart of the F-θ characteristic in accordance with the system of FIG. 13.

The performance of system 25a in Embodiment 3 are shown in FIGS. 15, 16 and 17, which are charts structured the same as FIGS. 7, 8 and 9, respectively, for a beam from laser source 26 with a wavelength of 780 nm. FIG. 15 shows that the focus position of the beam in the scan plane only varies between 0.25 mm and −0.25 mm from the image plane over the scan angle range. FIG. 16 shows that the focus position in the cross-scan plane only varies between 1.5 mm and −1.5 mm from the image plane over the scan angle range. FIG. 17 shows that the F-θ characteristic of system 25 is less than ±0.01% over the scan angle range.

The placement of the diffractive surface 42a on second element 35a in F-θ lens system 36a results in better optical performance compared to the Embodiments 1 and 2, as evidenced by the reduced variation in scan and cross-scan planes (lower field sag), the smaller % error in the F-θ characteristic, as well as the smaller F-number in Table 3. This is achieved however by placing the diffractive element of the F-θ lens on the lens element having the larger diameter, i.e., second element 35a. For example, the first element may be 70 mm in diameter, while the second element may be 120 mm in diameter. Since the larger diameter of the two lens elements of the F-θ lens has the diffractive element, the cost of manufacturing the diffractive element for the F-θ lens of Embodiment 3 may be greater than that of Embodiments 1 and 2, which have the smaller diameter first lens element with the diffractive element.

Since chromatic aberration is not an issue in this design because the laser diode 26 produces a beam which is nearly monochromatic, the diffractive surface profile 42a in F-θ lens 36a can be optimized to reduce the f-number of the system. In addition, the gaussian spot diameter for the system has a value of approximately 33 microns on substrate 50.

Using the same criteria as in Embodiments 1 and 2 to calculate the optical resolution in units of dots per inch (dpi) in the scan plane, the approximate values for the optical resolution of the F-θ lens in Embodiment 3 based on criteria (a), (b) and (c) are 769 dpi, 1270 dpi, and 864 dpi, respectively.

As those in the art can appreciate, the diffractive element of the above described F-θ lenses may be placed on both the first and second elements of system 25 or 25a. This may be achieved by spreading out the diffractive power of the single F-θ lens diffractive element 42 or 42a to diffractive elements (or surface profiles) on each of the first and second elements.

In conclusion, diffractive lens elements (or surfaces) in systems 25 and 25a are used to eliminate the need for toric surfaces. This results from the higher order astigmatic correction that can be obtained with diffractive surfaces (lenses) whether they are rotationally or non-rotationally symmetric. In addition, chromatic aberration correction provided in system 25 of Embodiment 1 is attained without the need for additional lens element or lens materials. This is due to the unique dispersion properties of diffractive surfaces. Correction of other aberrations, including spherical aberration and coma, may also be simplified using diffractive optics.

From the foregoing description, it will be apparent that there has been provided an improved optical system for scanning a beam with an F-θ lens system. Variations and modifications in the herein described system, within the scope of the invention, will undoubtedly suggest themselves to those skilled in the art. Accordingly, the foregoing description should be taken as illustrative and not in a limiting sense.

We claim:
1. An optical system for scanning a beam comprising:
a laser source for emitting a beam along a first path;
a deflector intersecting said first path for translating said beam into a scanning beam which moves along a second path in a scan plane;
a F-θ lens system in said second path comprising first and second elements for focusing said scanning beam onto an image plane transverse to said scan plane;
said first and second elements each comprising at least one body having a non-toric lens; and the body of at least one of said first and second elements also provides a diffractive element which corrects optical aberrations of said scanning beam, wherein said diffractive element corrects optical aberrations in said scanning beam which includes at least correcting of astigmatic aberrations of said scanning beam.

2. The optical system of claim 1 wherein:

said F-θ lens system has an optical axis and a focal length F in the scan plane;

said deflector moves said beam along said second path at an angle θ with respect to said optical axis in which said angle θ varies responsive to said deflector movement to provide said scanning beam;

said image plane being spaced from said lens system by said focal length F; and said first and second elements of said F-θ lens system being oriented to focus said scanning beam onto the image plane having a lateral position from the optical axis in the scan plane based upon said focal length F and angle θ.

3. The optical system of claim 1 wherein the diffractive element provided by at least one of said first and second elements corrects optical aberrations including both astigmatic and chromatic aberration of said scanning beam.

4. The optical system of claim 1 further comprising a substrate substantially located in said image plane.

5. The optical system of claim 1 wherein said deflector is a rotating polygonal mirror.

6. The optical system of claim 1 further comprising:

a lens intersecting said first path of said beam prior to said deflector for substantially collimating said beam from said laser source.

7. An optical system for scanning a beam comprising:

a laser source for emitting a beam along a first path;

a deflector intersecting said first path for translating said beam into a scanning beam which moves along a second path in a scan plane;

a lens system in said second path comprising first and second elements for focusing said scanning beam onto an image plane transverse to said scan plane;

said first and second elements each comprising at least one body having a non-toric lens; and the body of at least one of said first and second elements also provides a diffractive element wherein said body of said first and second elements providing said non-toric lens defines a first cylindrical surface and a second spherical surface.

8. The optical system of claim 7 wherein said body having said diffractive element provides a diffractive profile on said second spherical surface.

9. An optical system for scanning a beam comprising:

a laser source for emitting a beam along a first path;

a deflector intersecting said first path for translating said beam into a scanning beam which moves along a second path in a scan plane;

a lens system in said second path comprising first and second elements for focusing said scanning beam onto an image plane transverse to said scan plane;

said first and second elements each comprising at least one body having a non-toric lens; and the body of at least one of said first and second elements also provides a diffractive element wherein said body of said first and second elements is a cylindrical lens.

10. An optical system for scanning a beam comprising:

a laser source for emitting a beam along a first path;

a deflector intersecting said first path for translating said beam into a scanning beam which moves along a second path in a scan plane;

a lens system in said second path comprising first and second elements for focusing said scanning beam onto an image plane transverse to said scan plane;

said first and second elements each comprising at least one body having a non-toric lens; and the body of at least one of said first and second elements also provides a diffractive element, and wherein the body of both said first and second elements provides a diffractive element.

11. An optical system for scanning a beam comprising:

a laser source for emitting a beam along a first path;

a deflector intersecting said first path for translating said beam into a scanning beam which moves along a second path in a scan plane;

a lens system in said second path comprising first and second elements for focusing said scanning beam onto an image plane transverse to said scan plane;

said first and second elements each comprising at least one body having a non-toric lens;

the body of at least one of said first and second elements also provides a diffractive element; and a third lens element in said first path of said beam prior to said deflector for focusing said beam such that said second path of said beam is focused in a cross-scan plane substantially perpendicular to said scan plane.

12. The optical system of claim 11 wherein said third lens element comprises a body having another diffractive element.

13. The optical system of claim 12 wherein said another diffractive element corrects chromatic and spherical aberration of said beam in said cross-scan plane.

14. The optical system of claim 11 wherein said first, second and third lens elements are made of the same optical material.

15. An optical system for scanning a beam comprising:

a laser source for emitting a beam along a first path;

a deflector intersecting said first path for translating said beam into a scanning beam which moves along a second path in a scan plane;

a F-θ lens system in said second path comprising first and second elements for focusing said scanning beam onto an image plane transverse to said scan plane;

said first and second elements each comprising at least one body having a non-toric lens; and the body of at least one of said first and second elements also provides a diffractive element which corrects optical aberrations of said scanning beam, wherein said F-θ lens system has an optical axis and a focal length F in the scan plane, said deflector moves said beam along said second path at a varying angle θ with respect to said optical axis, and said F-θ lens system focuses said scanning beam into a nearly diffraction-limited spot having a lateral position from said optical axis in said scan plane approximately equal to F multiplied by θ.

16. A method for scanning a beam comprising the steps of:

emitting a beam from a laser source along a first path;

translating said beam from said first path into a scanning beam which moves along a second path in a scan plane; and directing said scanning beam through a F-θ lens system in said second path for focusing said scanning beam onto an image plane transverse to said scan plane, wherein said first and second elements each comprise at least one body having a non-toric lens, and the body of at least one of said first and second elements also provides a diffractive element which corrects at least astigmatic aberrations of said scanning beam.

17. The method of claim 16 wherein said body of said first and second elements provides a non-toric lens defining a first cylindrical surface and a second spherical surface.

18. The method of claim 17 wherein said body having said diffractive element provides a diffractive profile on said second spherical surface.

* * * * *